United States Patent
Shimizu et al.

(10) Patent No.: US 8,107,735 B2
(45) Date of Patent: Jan. 31, 2012

(54) THREE DIMENSIONAL SHAPE RECONSTITUTION DEVICE AND ESTIMATION DEVICE

(75) Inventors: Mikio Shimizu, Kariya (JP); Naoki Fukaya, Obu (JP); Takashi Bando, Ikoma (JP); Tomohiro Shibata, Ikoma (JP); Shin Ishii, Ikoma (JP)

(73) Assignees: Denso Corporation, Kariya (JP); National University Corporation Nara Institute of Science & Technologies, Ikoma (JP)

( * ) Notice: Subject to any disclaimer, the term of this patent is extended or adjusted under 35 U.S.C. 154(b) by 1155 days.

(21) Appl. No.: 11/906,557

(22) Filed: Oct. 2, 2007

(65) Prior Publication Data

US 2008/0253610 A1    Oct. 16, 2008

(30) Foreign Application Priority Data

Apr. 10, 2007  (JP) ................................. 2007-102914
Apr. 10, 2007  (JP) ................................. 2007-102915

(51) Int. Cl.
*G06K 9/00* (2006.01)
(52) U.S. Cl. ........ 382/190; 382/154; 382/224; 382/118; 345/587; 345/653; 345/664; 717/104
(58) Field of Classification Search .................. None
See application file for complete search history.

(56) References Cited

U.S. PATENT DOCUMENTS

| | | | |
|---|---|---|---|
| 6,628,819 B1 * | 9/2003 | Huang et al. | 382/154 |
| 6,873,724 B2 * | 3/2005 | Brand | 382/154 |
| 7,054,489 B2 * | 5/2006 | Yamaoka et al. | 382/203 |
| 2003/0123713 A1 * | 7/2003 | Geng | 382/118 |
| 2004/0062435 A1 * | 4/2004 | Yamaoka et al. | 382/159 |
| 2004/0161134 A1 * | 8/2004 | Kawato et al. | 382/118 |
| 2005/0020933 A1 * | 1/2005 | Sato | 600/544 |
| 2005/0169533 A1 * | 8/2005 | Paragyios | 382/203 |
| 2007/0147661 A1 | 6/2007 | Fukaya et al. | |
| 2009/0304290 A1 * | 12/2009 | Fukaya et al. | 382/224 |

FOREIGN PATENT DOCUMENTS

| | | |
|---|---|---|
| JP | 2000-003446 | 1/2000 |
| JP | 2003-141552 | 5/2003 |
| JP | 2003-242484 | 8/2003 |

(Continued)

OTHER PUBLICATIONS

The Institute of Electronics, Information and Communication Engineers, IEICE Technical Report vol. 106 No. 279, with partial English translation.

*Primary Examiner* — John Lee
(74) *Attorney, Agent, or Firm* — Harness, Dickey & Pierce, PLC

(57) ABSTRACT

A face model providing portion provides an stored average face model to an estimation portion estimating an affine parameter for obtaining a head pose. An individual face model learning portion obtains a result of tracking feature points by the estimation portion and learns an individual face model. The individual face model learning portion terminates the learning when a free energy of the individual face model is over a free energy of the average face model, and switches a face model provided to the estimation portion from the average face model to the individual face model. While learning the individual face mode, an observation matrix is factorized using a reliability matrix showing reliability of each observation value forming the observation matrix with emphasis on the feature point having higher reliability.

14 Claims, 8 Drawing Sheets

FOREIGN PATENT DOCUMENTS

| | | |
|---|---|---|
| JP | 2003-308089 | 10/2003 |
| JP | 2004-117503 | 4/2004 |
| JP | 2004-126857 | 4/2004 |
| JP | 2005-234214 | 9/2005 |
| JP | 2005-265918 | 9/2005 |
| JP | 2005-287675 | 10/2005 |
| JP | 2005-321660 | 11/2005 |
| JP | 2005-338358 | 12/2005 |
| JP | 2006-053431 | 2/2006 |
| JP | 2006-090916 | 4/2006 |
| JP | 2006-098425 | 4/2006 |
| JP | 2006-172026 | 6/2006 |
| JP | 2006-235389 | 9/2006 |
| JP | 2006-280806 | 10/2006 |

* cited by examiner

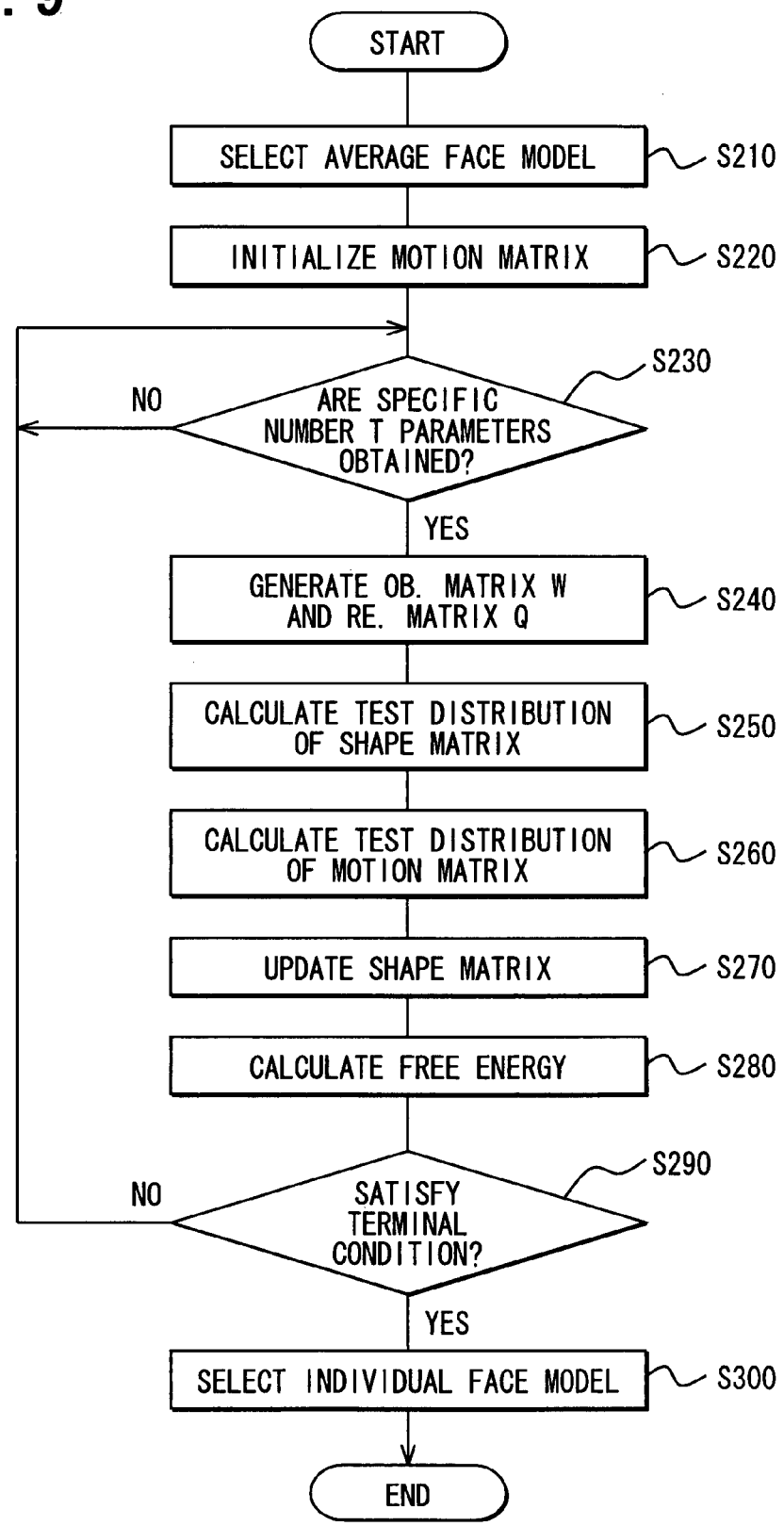

THREE DIMENSIONAL SHAPE RECONSTITUTION DEVICE AND ESTIMATION DEVICE

CROSS REFERENCE TO RELATED APPLICATIONS

This application is based on and incorporates herein by reference Japanese Patent Applications No. 2007-102914 filed on Apr. 10, 2007, and No. 2007-102915 filed on Apr. 10, 2007.

FIELD OF THE INVENTION

The present invention relates to a three dimensional shape reconstitution device for reconstituting a three dimensional shape of a target object from an image (two dimensional shape) of the target object, which is obtained by capturing the target image, and to an estimation device for estimating a direction of the target object in a three dimensional space from the captured image (two dimensional shape) of the target object.

BACKGROUND OF THE INVENTION

The factorization method is conventionally known as a method in which an image sequence of a target object is inputted, positions of multiple preset feature points are tracked on the image plane, and a three dimensional shape of the target object is reconstituted from a feature point position sequence obtained by the tracking.

In this factorization method, an observation matrix is generated from the feature point position sequence, and the observation matrix is factorized into a shape matrix showing a shape of the target object (three dimensional positions of the feature points) and a motion matrix showing a motion of the target object.

In the factorization method, to obtain the effective result, all the data forming the observation matrix is needed. Accordingly, it is difficult for the factorization method to be applied to the actual problem that defective data often generates in the feature point position sequence (and data forming the observation matrix) due to hiding of feature points, wrong tracking, and flame-out.

In contrast, the method in which after defective data is removed from the observation matrix, the observation matrix is factorized, and the method in which a partial observation matrix is generated by removing defective data from an observation matrix, and the defective data is estimated from a shape matrix and motion matrix obtained by factorizing the partial observation matrix, and an observation matrix in which the defective data is replaced with the estimation value (for example, see Patent Document 1) is factorized, have been suggested.

However, in the conventional methods, normal data and abnormal data need to be distinguished in generating an observation matrix. Since the distinguishing is difficult, its automatic processing is difficult. Sufficient accuracy of the distinguishing cannot be obtained. Distinguished abnormal data needs to be deleted. The estimation of defective data needs to be repeated. As a result, an amount of necessary calculations disadvantageously increases.

Additionally, in the conventional factorization method, to improve an estimation accuracy of a three-dimensional shape, an image sequence used for calculation needs to be enlarged (namely, the number of dimensions of an observation matrix is increased). Accordingly, an amount of the calculations (calculation time) increases exponentially.

Due to the large amount of the calculations, the conventional factorization method cannot be applied to a computing unit, having a limited calculation ability, such as a three dimensional shape reconstitution device mounted to a vehicle.

On the other hand, there is a known device for estimating a direction of a captured target object in a three-dimensional space in accordance with a three-dimensional shape (hereinafter also called a shape model) of a previously stored human head (hereinafter also called a target object) and multiple feature point sequences extracted from an image of the target object.

In such a device, when a model used for generating a shape model and a captured target object are the same as each other, a direction of the target object can be estimated accurately, but when the model and target object are different from each other, the estimation accuracy disadvantageously decreases.

On the other hand, there is a known method for separately learning shape models (individual models) of target objects to be captured, and for estimating a direction of the target object by use of the learned individual models (for example, see Patent Document 2), and there is a known method for previously producing shape models (average models) showing average shapes of multiple target objects, and for estimating a direction of the target object by use of the average models.

However, disadvantageously, in the method using the individual models, the estimation accuracy is likely to be improved for every target objects, but the estimation of a direction of the target object cannot be started immediately because the learning takes long time, and the estimation accuracy decreases remarkably in case of the failure of the learning.

In the method using the average models, the estimation of a direction of a target object can be started immediately because the learning of the models is unnecessary, but some errors always occur in the estimations, and thus the estimation accuracy cannot be improved because a three-dimensional shape of the target object does not match the three dimensional shapes shown by the average models.

Patent Document 1: JP-2000-113194 A (JP-3711203 B1, corresponding to U.S. Pat. No. 6,628,819)
Patent Document 2: JP-2003-141552A

SUMMARY OF THE INVENTION

To solve the above problems, a first object of the present invention is to execute factorization even when unreliable data is contained in an observation matrix (feature point position sequence), and to reduce calculation time, in a three dimensional shape reconstitution device. Further, a second object of the present invention is to provide an estimation device, which can obtain stable estimation results just after the start of the processing and enhance an estimation accuracy.

To achieve the above first object, as a first example of the present invention, a three dimensional shape reconstitution device is provided as follows. An observation matrix generating unit is configured for inputting an image sequence of a captured target object, for tracking a plurality of feature points preset to the target object on an image plane, and for generating an observation matrix including time-sequential arrangement of positions of the feature points. A factorizing unit is configured for factorizing the generated observation matrix in the observation matrix generating unit, and for generating a shape matrix showing a three dimensional shape of the target object and a motion matrix showing a motion of the target object. A reliability evaluating unit is configured for generating a position reliability evaluation value showing reliability of the position of each feature point. Here, the factorizing unit executes factorization with emphasis on the feature point having the high position reliability evaluation value.

As another example of the present invention, a method is provided for reconstituting a three dimensional shape. The method comprises: inputting an image sequence of a captured target object, for tracking a plurality of feature points preset to the target object on an image plane; generating an observation matrix including time-sequential arrangement of positions of the feature points; generating a position reliability evaluation value showing reliability of the position of each feature point; and factorizing the generated observation matrix with emphasis on the feature point having the high position reliability evaluation value to thereby generating (i) a shape matrix showing a three dimensional shape of the target object and (ii) a motion matrix showing a motion of the target object.

To achieve the above second object, as a second example of the present invention, an estimation device is provided as follows. A shape model setting unit is configured for setting shape models showing three dimensional shapes of target objects whose shapes have individual differences. A feature point extracting unit is configured for inputting an image sequence of a captured specific target object, the specific target object being one of the target objects, and extracting a plurality of feature points existing on the specific target object. An object direction estimating unit is configured for estimating a direction of the specific target object in accordance with the shape models which are set in the shape model setting unit and the feature points extracted in the feature point extracting unit. The shape model generating unit includes (i) a storing unit configured for storing an average model showing an average shape of the target objects, (ii) a learning unit configured for learning an individual model showing a shape of the specific target object in accordance with a result of extracting in the feature point extracting unit, and (iii) a model switching unit configured for setting the average model stored in the storing unit as the shape model at a start of the device, and for setting the individual model as the shape model instead of the average model when a switching condition showing that the individual model learned in the learning unit becomes more reliable than the average model is satisfied.

As another example of the present invention, a method is provided for estimating a direction of a target object. The method comprises: inputting an image sequence of a captured specific target object, the specific target object being one of target objects; extracting a plurality of feature points existing on the specific target object; storing an average model showing an average three dimensional shape of the target objects whose shapes have individual differences; learning an individual model showing a three dimensional shape of the specific target object in accordance with a result of the extracting; setting the average model as the shape model initially, and setting the individual model as the shape model instead of the average model when a switching condition showing that the learned individual model becomes more reliable than the average model is satisfied; and estimating a direction of the specific target object in accordance with the set shape model and the extracted feature points.

BRIEF DESCRIPTION OF THE DRAWINGS

The above and other objects, features, and advantages of the present invention will become more apparent from the following detailed description made with reference to the accompanying drawings. In the drawings:

FIG. 9 is a flowchart showing a process of the individual face model learning portion in a second embodiment.

DETAILED DESCRIPTION OF THE PREFERRED EMBODIMENTS

Embodiments of the present invention are explained below in reference to the drawings.

First Embodiment

Figure 1:
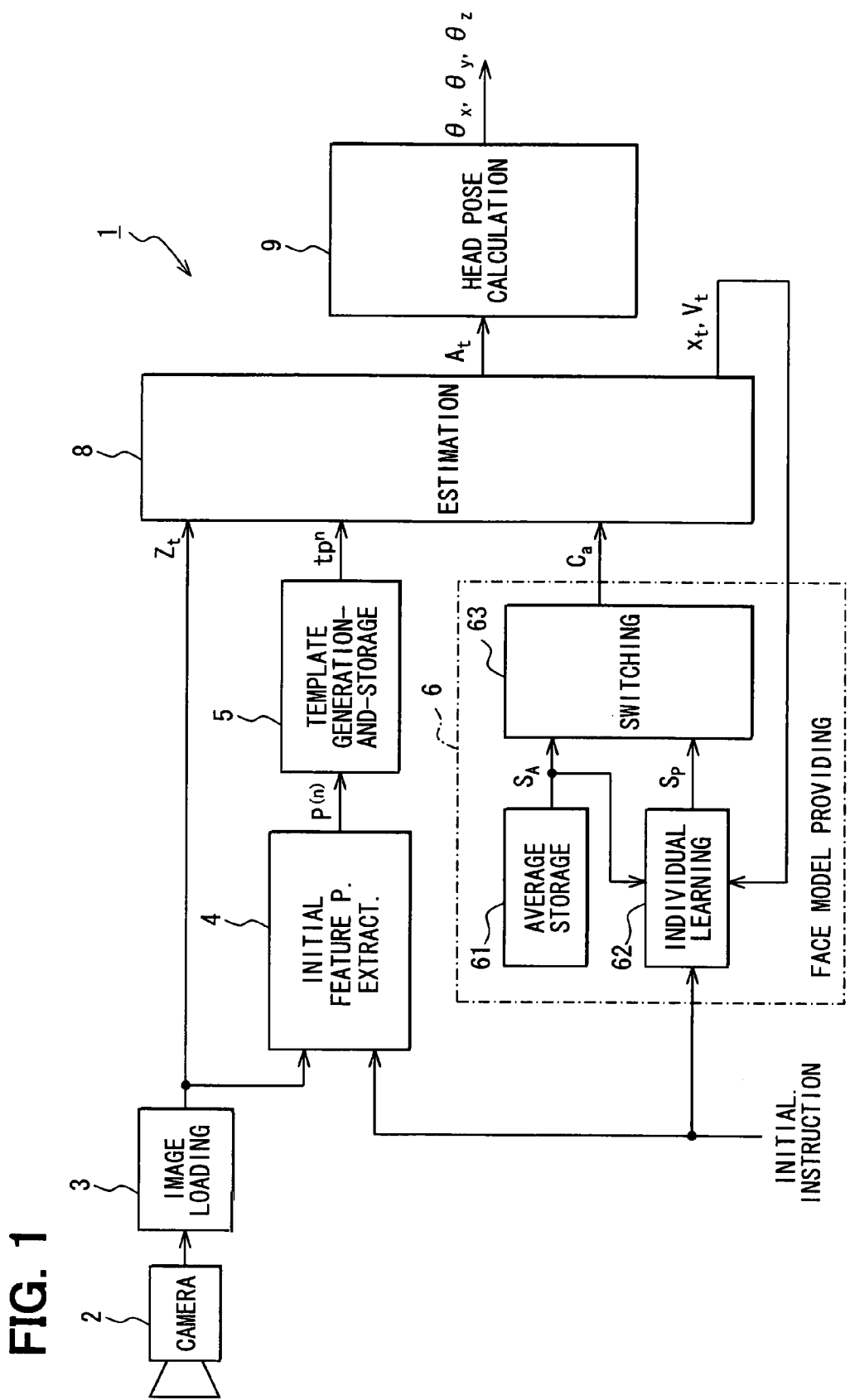
FIG. 1 is a block diagram showing an entire structure of an image processing device according to a first embodiment of the present invention.

FIG. 1 is a block diagram showing an entire structure of an image processing device 1 as a three dimensional reconstitution device or estimation device according to a first embodiment of the present invention. The image processing device 1 is mounted to a subject vehicle, and obtains a head pose time-sequentially from an image of a head of a driver captured by a camera. The head pose is used for detecting inattentive driving and drowsy driving of the driver.

Entire Structure

The image processing device 1 is installed over or under a surface in front of a driver's seat (for example, in a meter). The image processing device 1 includes the following: a camera 2; an image loading device 3; an initial feature point extraction portion 4; a template generation-and-storage portion 5; a face model providing portion 6; an estimation portion 8; and a head pose calculation portion 9.

The camera 2 is configured for obtaining or capturing an image including a head of the driver as shown in FIG. 1. The image loading device 3 is configured for loading an image obtained by the camera 2. The initial feature point extraction portion 4, which may function as a feature point extracting means or unit, is configured for extracting positions (two dimensional coordinates: hereinafter called feature point positions) $p^{(n)}$ (n=1, 2, ... $N_f$) of multiple ($N_f$-number) feature points showing a feature of a face of the driver from an input image $z_t$ (t shows a time) loaded via the image loading device 3 in response to an input of an initial instruction. The template generation-and-storage portion 5 is configured for extracting, as a template $tp^{(n)}$, an image of a predetermined size around each feature point $p^{(n)}$ extracted by the initial feature point extraction portion 4. The face model providing portion 6, which may function as a shape model setting means or unit, is configured for providing a face model (shape matrix) $C_a$ defining three dimensional positions of the feature points (and a three dimensional shape of the head). The estimation portion 8 is configured for estimating an affine parameter $A_t$ showing a head pose in accordance with the input $z_t$, template $tp^{(n)}$ and face model $C_a$ by the time series Bayes estimation, and for providing, to the face model providing portion 6, a feature point estimation distribution parameter (average value $x_t$, variance $V_t$) for defining a distribution of each feature point calculated through the estimation. The head pose calculation portion 9 is configured for calculating a head pose θx, θy, and θz in accordance with the affine parameter $A_t$ estimated by the estimation portion 8. The estimation portion 8 and head pose calculation portion 9 may function as an object direction estimating means or unit for estimating a direction of a specific target object.

Figure 2:
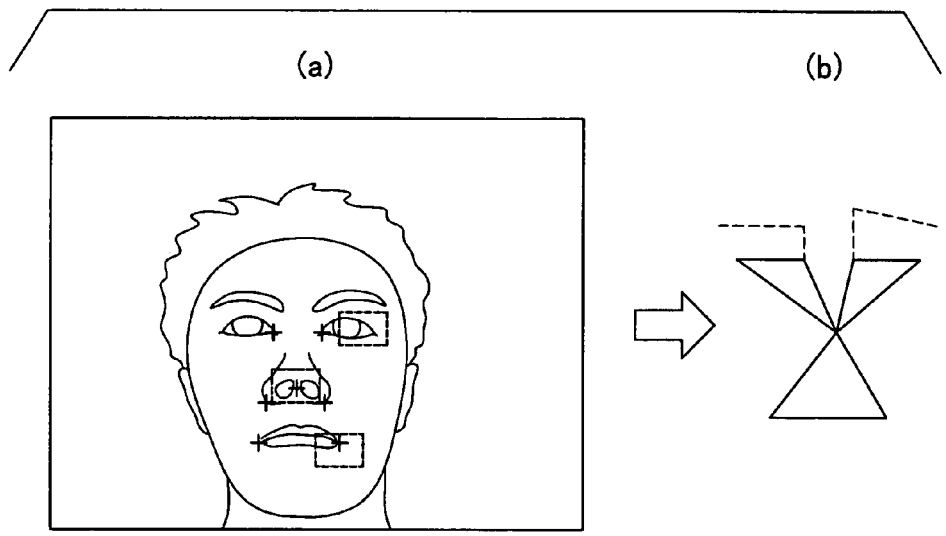
FIG. 2 is an explanatory diagram of feature points and templates.

As shown in (a) of FIG. 2, the initial feature point extraction portion 4 extracts outer corners of the eyes, inner corners of the eyes, mouth, and nose (nasal cavities, center of the nose, and both corners of the nose) as the feature points. In this embodiment, seven (=$N_f$) points: both outer corners of the eyes; both inner corners of the eyes; both inner corners of the mouth; and center of the nose are extracted. The initialization instruction is inputted by a driver when the driver facing the front and the camera 2 captures an image including all feature points of the driver (no hiding of the feature points).

The template $tp^{(n)}$ generated by the template generation-and-storage portion 5 is a white dot line frame in (a) of FIG. 2. In this figure, the frames of only the left corner of the mouth, the center of the nose, and the outer corner of the left eye are shown.

Figure 3:
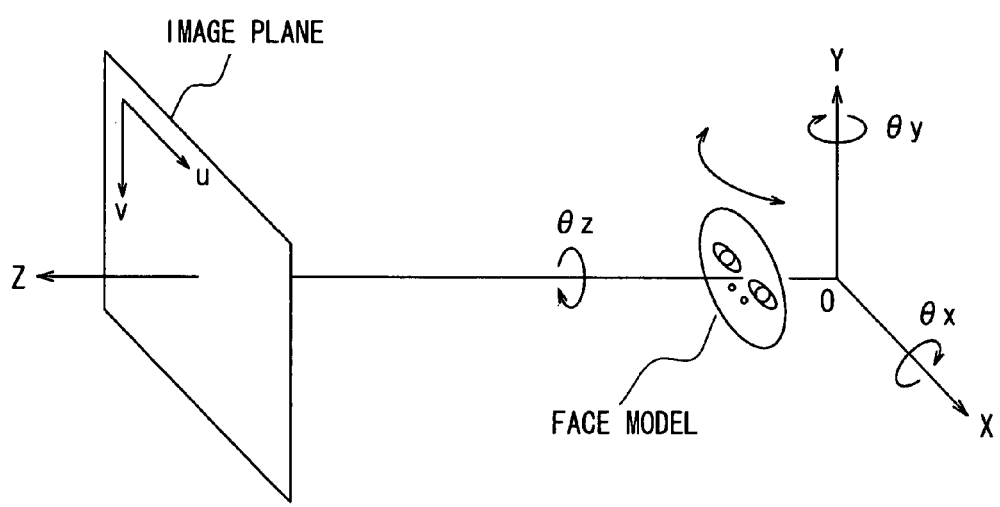
FIG. 3 is an explanatory diagram of a coordinate system used by the image processing device.

The face model $C_a$ provided from the face model providing portion 6 defines the positions of the feature points (vertexes shown in (b) of FIG. 2) three-dimensionally. As shown in FIG. 3, the face model $C_a$ is shown by equations (1), (2), wherein, a horizontal coordinate axis on the image plane is a u axis, a vertical coordinate axis on the image plane is a v axis, a horizontal coordinate axis in the three dimensional space is an X axis, a vertical coordinate axis in the three dimensional space is a Y axis, a coordinate axis in the optical axis direction (depth direction) is a Z axis, and wherein $s^{(n)}$ is a coordinate of the n-th feature point in the three dimensional space extracted by the initial feature point extraction portion 4 (feature point position $p^{(n)} = (u^{(n)}, v^{(n)})$).

(Expression 1)

$$C_a = \begin{pmatrix} s^{(1)} & \ldots & s^{(Nf)} \\ 1 & \ldots & 1 \end{pmatrix} \quad (1)$$

Wherein $$s^{(n)} = (X^{(n)}, Y^{(n)}, Z^{(n)})^T \in R^{3 \times Nf} \quad (2)$$

The affine parameter $A_t$ estimated by the estimation portion 8 is a transformation matrix used for showing a coordinate transformation in the real world (three dimensional XYZ space) as a coordinate transformation on the image plane (two dimensional uv plane), which is a projecting plane, and has a relationship shown by equations (3), (4).

A three dimensional coordinate is $(X, Y, Z)^T$, a three dimensional coordinate after the coordinate transformation is $(X', Y', Z')^T$, and two dimensional coordinates of the image plane on which these three dimensional coordinates are projected, namely, coordinates of a feature point on the image plane, are $(u, v)^T$, $(u', v')^T$, assuming that X=u, Y=v (X'=u', Y'=v').

(Expression 2)

$$\begin{pmatrix} u' \\ v' \end{pmatrix} = \begin{pmatrix} X' \\ Y' \end{pmatrix} = A_t \begin{pmatrix} X \\ Y \\ Z \\ 1 \end{pmatrix} \quad (3)$$

Wherein $$A_t = \begin{pmatrix} a_1 & a_2 & a_3 & a_4 \\ a_5 & a_6 & a_7 & a_8 \end{pmatrix} \quad (4)$$

The head pose calculation portion 9 calculates angles of the three axes θx, θy, and θz of the head as head pose information by use of equations (5) to (7).

(Expression 3)

$$\theta_x = \arcsin(-a_7) \quad (5)$$

$$\theta_y = \arcsin\left(\frac{a_3}{\sqrt{1-a_7^2}}\right) \quad (6)$$

$$\theta_z = \arcsin\left(\frac{a_5}{\sqrt{1-a_7^2}}\right) \quad (7)$$

A transformation matrix Rx is used for rotating the three dimensional coordinate around the X axis by the angle of θx, a transformation matrix Ry is used for rotating the three dimensional coordinate around the Y axis by the angle of θy, and a transformation matrix Rz is used for rotating the three dimensional coordinate around the Z axis by the angle of θz. When these transformation matrixes are operated to transform the three dimensional coordinate $(X, Y, Z)^T$ to $(X', Y', Z')^T$, their relationship is shown by equations (8), (9).

(Expression 4)

$$\begin{pmatrix} X' \\ Y' \\ Z' \end{pmatrix} = R_t \begin{pmatrix} X \\ Y \\ Z \end{pmatrix} = \begin{pmatrix} r_1 & r_2 & r_3 \\ r_4 & r_5 & r_6 \\ r_7 & r_8 & r_9 \end{pmatrix} \begin{pmatrix} X \\ Y \\ Z \end{pmatrix} \quad (8)$$

Wherein $$R_t = R_y R_x R_z = \quad (9)$$

$$\begin{pmatrix} 1 & 0 & 0 \\ 0 & \cos\theta_x & -\sin\theta_x \\ 0 & \sin\theta_x & \cos\theta_x \end{pmatrix} \begin{pmatrix} \cos\theta_y & 0 & \sin\theta_y \\ 0 & 1 & 0 \\ -\sin\theta_y & 0 & \cos\theta_y \end{pmatrix} \begin{pmatrix} \cos\theta_z & -\sin\theta_z & 0 \\ \sin\theta_z & \cos\theta_z & 0 \\ 0 & 0 & 1 \end{pmatrix}$$

When, in addition to the above rotation, a parallel transformation of the three dimensional coordinate is done by $t_1$ in the X axis direction, by $t_2$ in the Y axis direction, and by $t_3$ in the Z axis direction, the transformation equation is shown by equation (10).

(Expression 5)

$$\begin{pmatrix} X' \\ Y' \\ Z' \\ 1 \end{pmatrix} = \begin{pmatrix} r_1 & r_2 & r_3 & t_1 \\ r_4 & r_5 & r_6 & t_2 \\ r_7 & r_8 & r_9 & t_3 \\ 0 & 0 & 0 & 1 \end{pmatrix} \begin{pmatrix} X \\ Y \\ Z \\ 1 \end{pmatrix} \quad (10)$$

By comparing equation (3) to equation (10), correspondence between affine parameters $a_1$ to $a_8$ and elements $r_1$ to $r_6$, $t_1$, and $t_2$ of the transformation matrix shown in equation (10) can be obtained. By arranging equation (9), relational equations shown in (11) to (18) can be obtained.

(Expression 6)

$$a_1 = r_1 = \cos\theta_y \cos\theta_z + \sin\theta_y \sin\theta_x \sin\theta_z \quad (11)$$

$$a_2 = r_2 = -\cos\theta_y \sin\theta_z + \sin\theta_y \sin\theta_x \cos\theta_z \quad (12)$$

$$a_3 = r_3 = \sin\theta_y \cos\theta_x \quad (13)$$

$$a_4 = t_1 \quad (14)$$

$$a_5 = r_4 = \cos\theta_x \sin\theta_z \quad (15)$$

$$a_6 = r_5 = \cos\theta_x \cos\theta_z \quad (16)$$

$$a_7 = r_6 = -\sin\theta_x \quad (17)$$

$$a_8 = t_2 \quad (18)$$

From equations (11) to (18), equations (5) to (7) can be introduced.

When the affine parameter $A_t$ showing the head pose at the time t is obtained, the affine parameter $A_t$ is operated to the face model $C_a$, so that all the positions of the feature points at the time t including the positions of the feature points hidden and not shown in the image can be predicted.

Camera parameters (focal distance, installation location, and direction of a camera) and a change of the head pose of the driver can be all reflected by the affine parameter $A_t$.

Structure of the Estimation Portion

Figure 4:
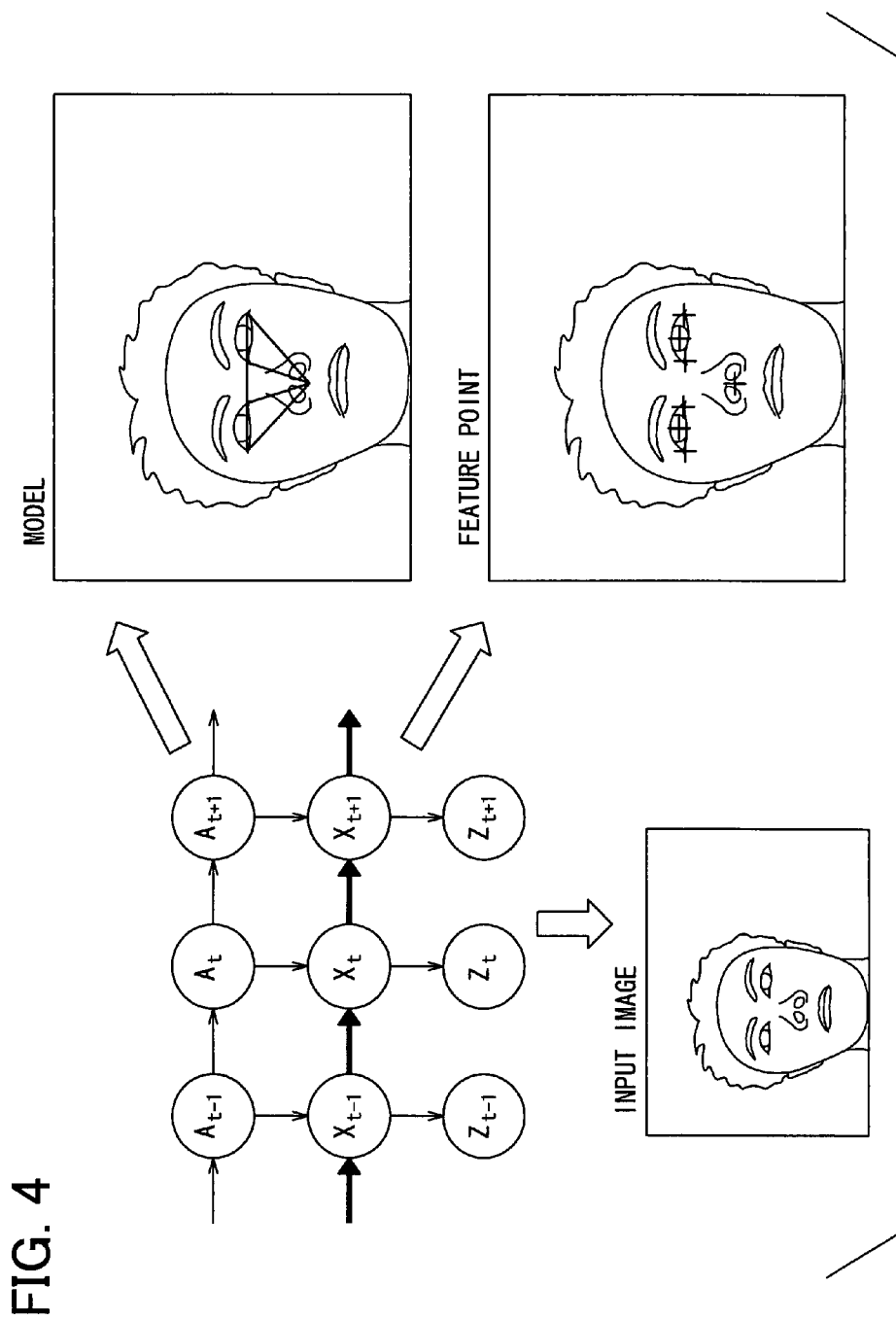
FIG. 4 is a graph showing a state space model used by an estimation portion.

FIG. 4 is a graph showing a state space model used by the estimation portion 8.

As shown in FIG. 4, the estimation portion 8 includes an upper layer for obtaining the affine parameter $A_t$ showing a pose of a face model at the time t as a hidden state and $N_f$ lower layers (only one is shown in FIG. 4) for obtaining positions of the feature points at the time t $x_t = (x_t^{(1)}, x_t^{(2)}, \ldots, xt^{(Nf)})^T$ as a hidden state, the lower layers each being provided at each feature point. From an input image sequence $z_{1:t}$ inputted from a time 1 to the time t, the hidden states $A_t$, $x_t$ are estimated by the time-sequence Bayes estimation.

Figure 5:
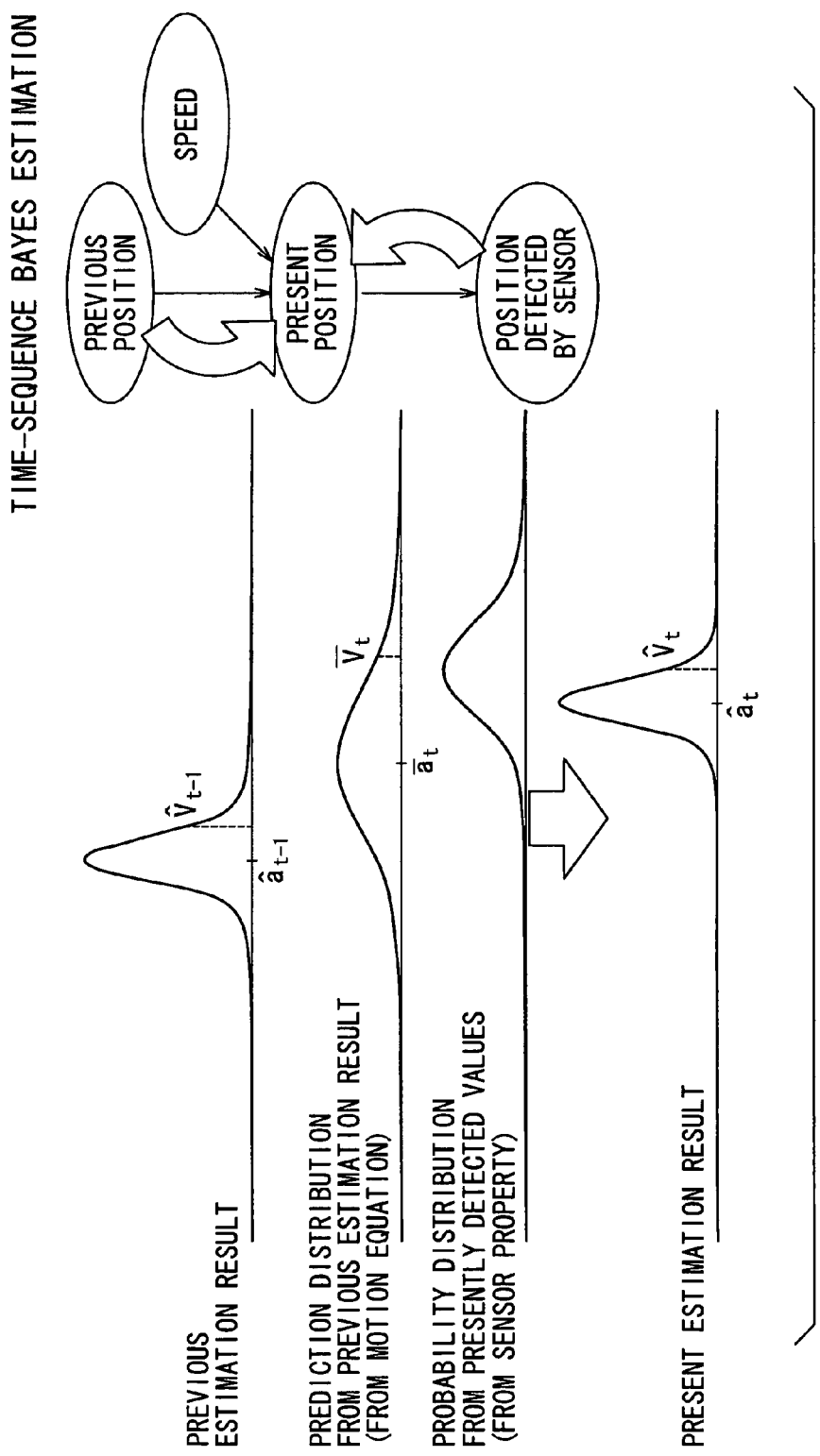
FIG. 5 an explanatory diagram of an overview of operation of a time-sequence Bayes estimation.

As shown in FIG. 5, the time-sequence Bayes estimation uses all state variables as probability variables. Then, the time-sequence Bayes estimation obtains a prediction distribution at the time t from the estimation result (estimation distribution) at the time t−1 about the hidden state, and obtains a likelihood, which is the hidden state to be detected, from the observation data at the time t. In consideration of the prediction distribution and likelihood, the time-sequence Bayes estimation obtains the estimation result (estimation distribution) at the time t repeatedly to estimate the hidden state successively.

The estimation portion 8 obtains a posterior probability distribution (estimation distribution) $p(A_t|z_{1:t})$, which is obtained by estimating the affine parameter (hidden state of the head pose) $A_t$ in accordance with the input image sequence (observation data) $Z_{1:t}$. This is shown by equations (19), (20).

(Expression 7)

$$p(A_t|z_{1:t}) \propto p(A_t|z_{1:t-1}) p(z_t|A_t, z_{1:t}) \quad (19)$$

Wherein $$p(z_t|A_t, z_{1:t-1}) = \int p(z_t|x_t) p(x_t|A_t, z_{1:t-1}) dx \quad (20)$$

In this case, $P(A_t|z_{1:t-1})$ shows a prior probability distribution (prediction distribution) of the affine parameter $A_t$, $p(x_t|A_t, z_{1:t-1})$ shows a prior probability distribution (prediction distribution) of positions $x_t$ of the feature points, and $p(x_t|A_t, z_{1:t-1})$ and $p(z_t|x_t)$ show the likelihood.

The portion of equation (20) is estimated by the lower layer by use of a particle filter, and the portion of the equation (19) is estimated by the upper layer by use of a Kalman filter.

When a probability distribution of a parameter f follows a Gaussian distribution (normal distribution), the probability distribution is shown by equation (21) wherein an average is μ, and a variance is Σ. In this case, actually, the calculation of a probability distribution of a parameter is sufficiently achieved by obtaining the average μ, and the variance Σ.

(Expression 8) (21)

$$N_D(f|\mu, \Sigma) = (2\pi)^{-\frac{D}{2}} |\Sigma|^{-\frac{1}{2}} \exp\{(f-\mu)^T \Sigma^{-1} (f-\mu)\}$$

Figure 6:
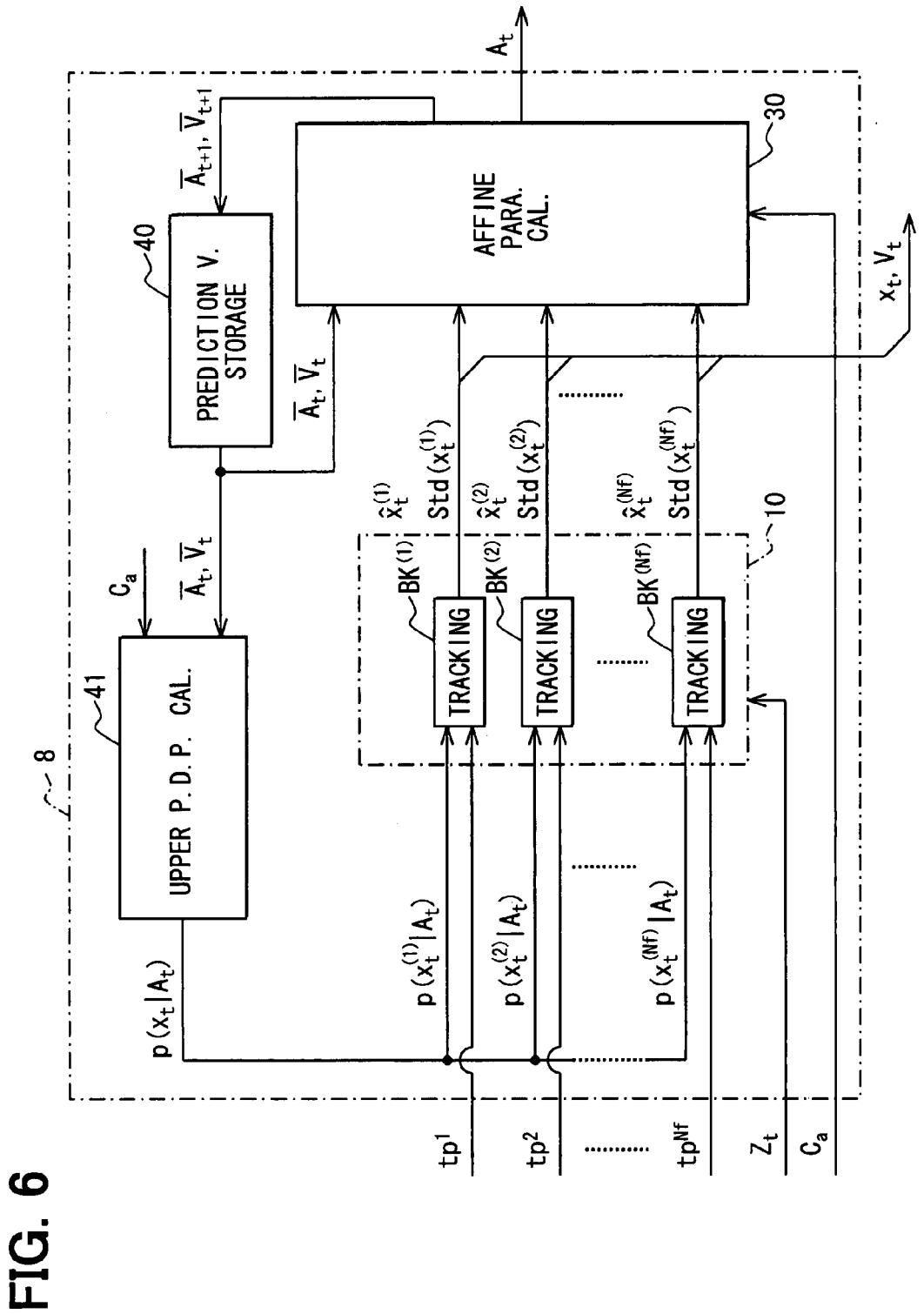
FIG. 6 is a block diagram showing a structure of the estimation portion.

Next, FIG. 6 is a block diagram showing a detailed structure of the estimation portion 8.

As shown in FIG. 6, the estimation portion 8 includes $N_f$ tracking devices $BK^{(n)}$ provided in the respective feature points $^{(Nf)}$. Each tracking device tracks the position $x^{(n)}$ of one feature point. Each tracking device comprises: a feature point tracking portion 10 for generating a feature point estimation distribution parameter (average, standard deviation) defining a probability distribution obtained by applying a gaussian approximation to a probability distribution which estimates the position $x_t^{(n)}$ of each feature point at the time t; an affine parameter calculation portion 30 for calculating the affine parameter $A_t$, a prediction value $A_{t+1}$ of the affine parameter, and its variance $V_{t+1}$ (hereinafter called prediction values) by use of the Kalman filter in accordance with the feature point estimation distribution parameter calculated by each tracking device $BK^{(n)}$; a prediction value storage portion 40 for storing the prediction values of the affine parameter calculated by the affine parameter calculation portion 30; and a prediction distribution parameter calculation portion 41 for calculating an upper prediction distribution parameter (average value, variance) defining a probability distribution $p(x_t|A_t)$ which predicts the positions $x_t (=(x_t^{(1)}, x_t^{(2)}, \ldots, x_t^{(Nf)})^T)$ of the feature points at the time t in accordance with the prediction values of the affine parameter calculated at the time t−1, the prediction values being stored in the prediction value storage portion 40, and for providing the upper prediction distribution parameter to each tracking device $BK^{(n)}$.

The affine parameter calculation portion 30 corresponds to the upper layer, and each tracking device $BK^{(n)}$ forming the feature point tracking portion 10 corresponds to the lower layer.

The detailed structure of the estimation portion 8 is described, for example, in JP-2007-172237 A (US2007/0147661 A1) which is incorporated herein by reference, and accordingly abbreviated here. Only the overview of the tracking devices $BK^{(n)}$ relating to the generation of the feature point estimation parameter is explained below.

Overview of the Tracking Devices

Each tracking device $BK^{(n)}$ forming the feature point tracking portion 10 tracks one feature point by use of the particle filter. The overview of the particle filter is explained in reference to the explanatory view of FIG. 7.

Figure 7:
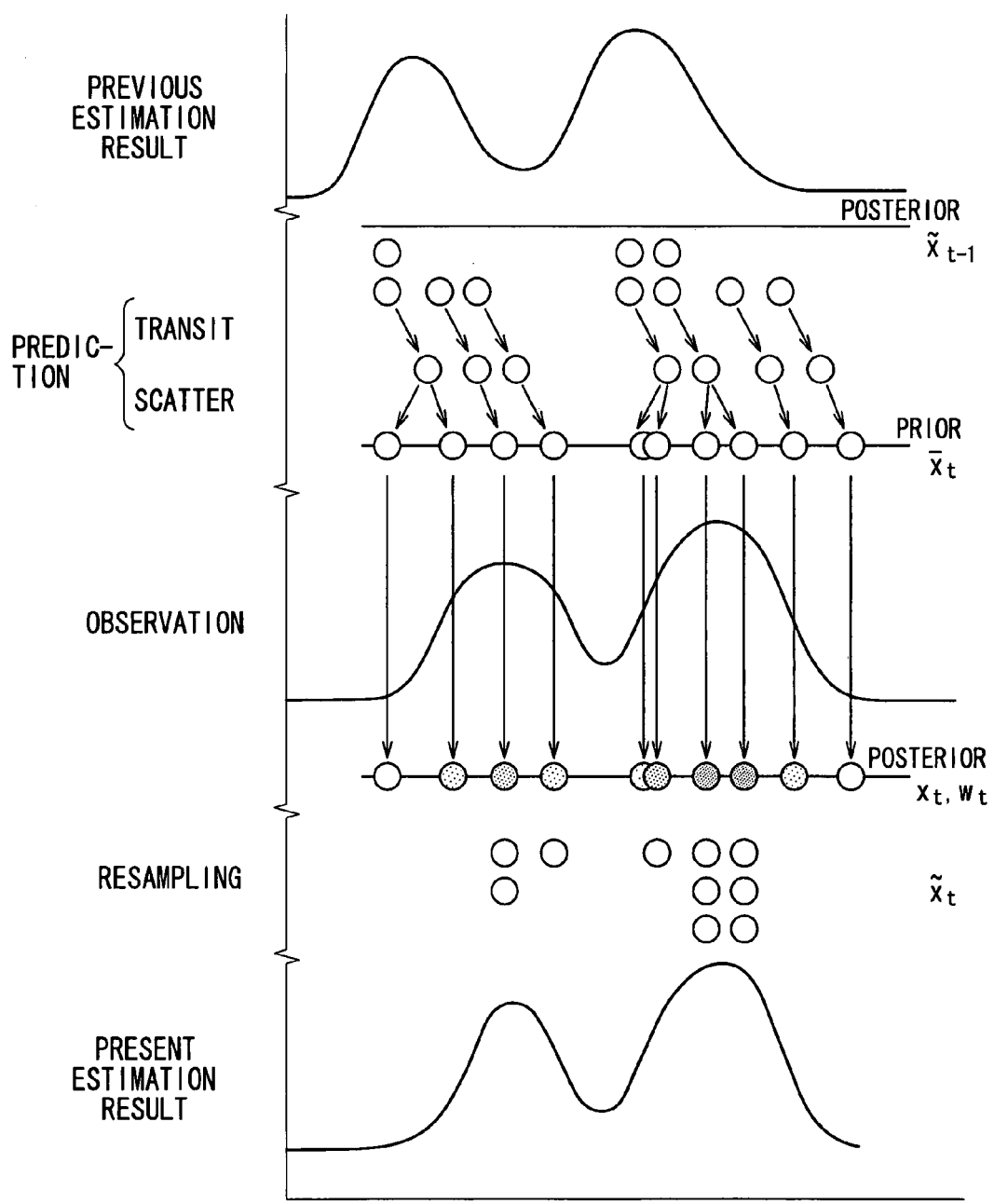
FIG. 7 is an explanatory diagram showing an overview of operation of a particle filter.

As shown in FIG. 7, in the particle filter, an occurrence (coordinate on the image plane) of a state of a target to be estimated is shown as a particle, and prediction, observation, and resampling are executed repeatedly to obtain a distribution of the particles time-sequentially. Not like in the Kalman filter, in the particle filter, any probability distribution can be a target, as well as the Gaussian distribution.

First, in the prediction, in consideration of a target to be estimated, a state of each particle (position on the image plane) in a state space (on the image plane) is transited. Then, in consideration of noise added to a motion of the target to be estimated, the particles are scattered stochastically to place the particles to positions where the target is likely to exit.

Accordingly, a probability distribution predicting the state of the target is shown discretely and approximately by the positions and number of the particles.

Next, in the observation, in accordance with a likelihood that the state of each particle is the state of the target to be estimated (normalization correlation values between the particles and the template showing the feature points), weights of the particles are calculated. Accordingly, the probability distribution of the state of the target to be estimated is shown by the weighted particles.

In the resampling, the less weighted particles are removed, and the more weighted particles are propagated to multiple particles not weighted, so that the probability distribution of the state of the target to be estimated is stochastically shown by the particles not weighted, instead of the weighted particles.

Then, the prediction is executed using the particles generated during the resampling, so that the probability distribution of the state of the target to be estimated, the distribution being shown by the particles, can be obtained time-sequentially.

The probability distribution of the state (positions of the feature points) of the target to be estimated, the distribution being obtained by the observation, is shown by an average value shown by equations (22), (23) and a variance shown by equations (24), (25), wherein Np is the number of the particles, $p_i=(u_i, v_i)$ is a coordinate of the particle on the image plane, and $w_i$ (i=1, 2, ..., $N_p$) is the weight of the particle calculated in the observation in accordance with the likelihood.

(Expression 9)

$$x^{(n)} = \sum_{i=1}^{N_p} w_i u_i \quad (22)$$

$$y^{(n)} = \sum_{i=1}^{N_p} w_i v_i \quad (23)$$

$$V_x^{(n)} = \sum_{i=1}^{N_p} w_i (u_i - x^{(n)})^2 \quad (24)$$

$$V_y^{(n)} = \sum_{i=1}^{N_p} w_i (v_i - y^{(n)})^2 \quad (25)$$

In other words, $x_t=(x_t^{(1)}, x_t^{(2)}, \ldots, x_t^{(Nf)})$, $V_t=(V_t^{(1)}, V_t^{(2)}, \ldots, V_t^{(Nf)})$ are provided to the face model providing portion 6 at each time t as the feature point estimation distribution parameters, wherein $x_t^{(n)}=(x^{(n)}, y^{(n)})$ is the average value of the probability distribution showing a position of the n-th feature point at the time t, and $V_t^{(n)}=(V_x^{(n)}, V_y^{(n)})$ is the variance of the probability distribution showing a position of the n-th feature point at the time t.

Face Model Providing Portion

Next, the face model providing portion 6, the main portion of the embodiment, is explained in detail.

As shown in FIG. 1, the face model providing portion 6 extracts feature points from videos of heads of multiple persons. The face model providing portion 6 includes: an average face model storage portion 61; an individual face model learning portion 62; and a face model switching portion 63. The average face model storage portion 61, which may function as a storing means or unit, is configured for storing an average face model $S_A$ showing arrangement of the average feature points set in accordance with the extraction result. The individual face model learning portion 62, which may function as a learning means or unit, is configured to start in response to an initialization instruction, and learn and generates an individual face model $S_p$ showing arrangement of the feature points of an object (driver) taken by the camera 2 in accordance with the feature point estimation distribution parameters $x_t$, $V_t$ sequentially provided from the estimation portion 8. The face model switching portion 63, which may function as a model switching means or unit, is configured for selecting the average face model $S_A$ stored in the average face model storage portion 61 or the individual face model $S_p$ generated in the individual face model learning portion 62 as the face model $C_a$, and for providing the selected one to the estimation portion 8, in accordance with a switch signal from the individual face model learning portion 62.

Overview of the Learning

In the individual face model learning portion 62, the learning is done through the following procedure.

The relationship W=MS is established wherein S is a shape matrix showing a three dimensional shape (individual face model $S_p$) to be obtained, W is an observation matrix generated in accordance with a sequence of the feature point estimation distribution parameter $x_t$, and M is a motion matrix showing a motion of the shape matrix S. In other words, the observation matrix W can be factorized to the motion matrix M and shape matrix S In accordance with the Bayes estimation equation defining the relationship between the posterior probability P(M, S|W) and likelihood P(W|M, S), the test distribution q(M) of the motion matrix and the test distribution q(S) of the shape matrix wherein the likelihood P(W|M, S) is maximized are obtained to estimate the motion matrix M and the shape matrix S.

This is equivalent to obtaining of M, S for maximizing the free energy F(q(M, S)), specifically, to solving of equations (27), (28).

(Expression 10)

$$F[q(\tilde{M}, S)] = \log P(W) - KL(q(\tilde{M}, S) \| P(\tilde{M}, S | W)) \quad (26)$$
$$= Nf \times L - H \geq 0$$

Wherein $$L = \frac{1}{Nf} \sum_{n=1}^{Nf} \int q_n(s^{(n)}) q(\tilde{M}) \log\left(\frac{p(x^{(n)}, s^{(n)} | \tilde{M})}{q_n(s^{(n)})}\right) ds^{(n)} d\tilde{M}$$

$$H = \int q(\tilde{M}) \log \frac{q(\tilde{M})}{p(\tilde{M})} d\tilde{M}$$

$$\frac{\partial F[q(M, S)]}{\partial q(M, S)} = 0 \quad (27)$$

$$\int \int q(M, S) dM dS = 1 \quad (28)$$

However, this calculation is not solved easily. On the assumption that equation (29) is established (an occurrence probability is assumed in the motion matrix M and shape matrix S separately), and that the occurrence probabilities of a model structure (shape matrix S) and motion structure (motion matrix M) follow the normal distribution, the calculation is done by the variational Bayesian method.

(Expression 11)

$$q(M,S)=q(M)q(S) \quad (29)$$

Accordingly, the distribution to be obtained follows the normal distribution, so that the equation to be solved can be simplified such that the feature point estimation distribution parameters $x_t$, $V_t$ showing a shape of the distribution are optimized.

In E step of the variational Bayesian method, with fixing the distribution q(M) of the motion matrix, the calculation may be done for maximizing the free energy. The calculation of equation (32) obtained by solving, by use of Lagrange's method of undetermined multipliers, equations (30), (31) to which equations (27), (28) are transformed, may be executed. The mark ^ (hat) provided to the symbols in the equations shows an update value (hereinafter the same).

(Expression 12)    (30)
$$\frac{\partial F[q(S)]}{\partial q(S)} = 0$$

$$\int q(S)dS = 1 \quad (31)$$

$$\hat{q}(S) = N_3(S \mid \hat{S}, \hat{\Sigma}_s) \quad (32)$$

In M step of variational Bayesian method, with fixing the distribution q(S) of the shape matrix, the calculation may be done for maximizing the free energy. The calculation of equation (35) obtained by solving, by use of Lagrange's method of undetermined multipliers, equations (33), (34) to which equations (27), (28) are transformed, may be executed.

(Expression 13)    (33)
$$\frac{\partial F[q(M)]}{\partial q(M)} = 0$$

$$\int q(M)dM = 1 \quad (34)$$

$$\hat{q}(M) = N_D(M \mid \hat{M}, \hat{\Sigma}_M) \quad (35)$$

<Process in the Individual Face Model Learning Portion>

Figure 8:
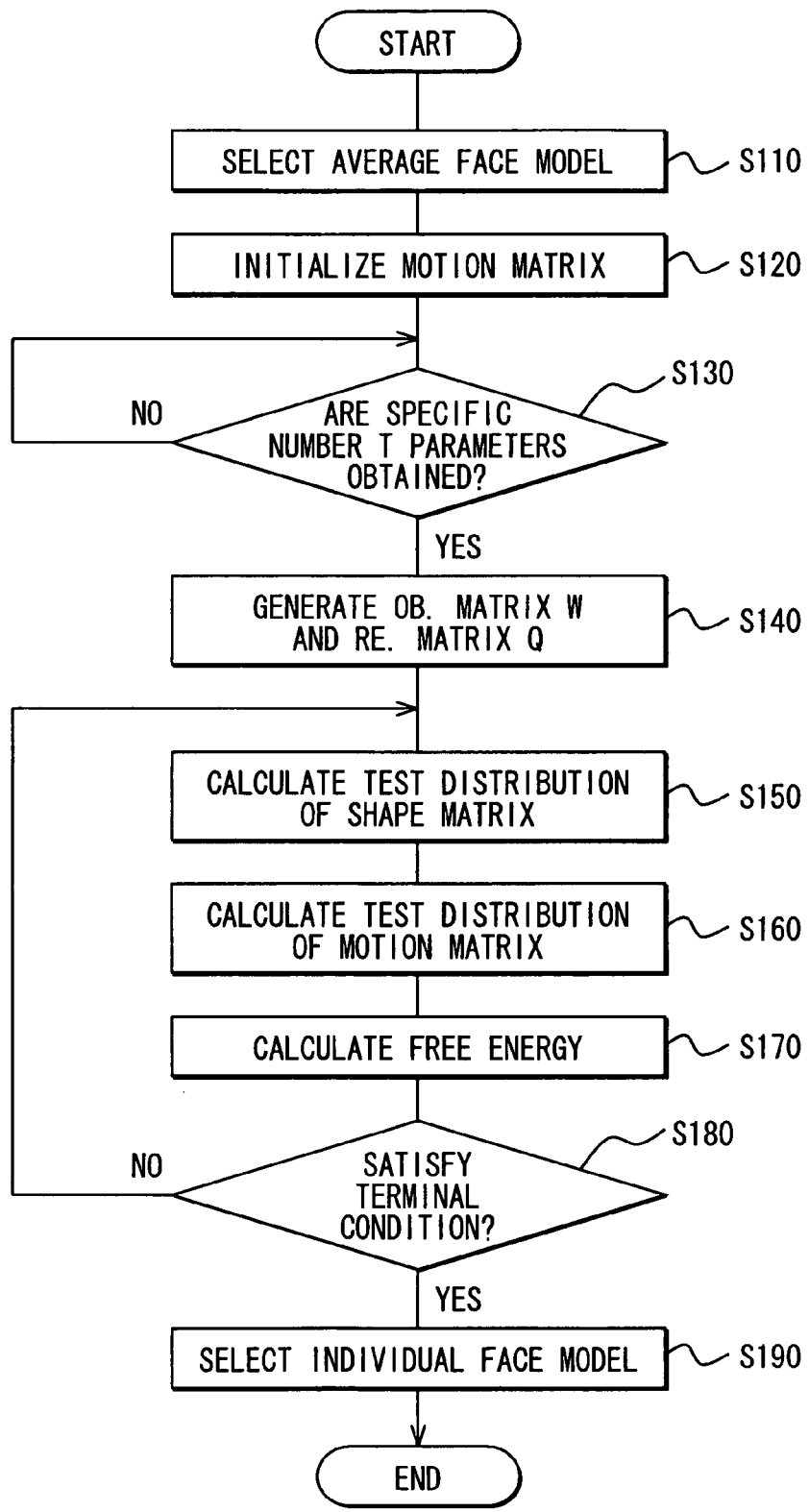
FIG. 8 is a flowchart showing a process of an individual face model learning portion in the first embodiment.

The process executed by the individual face model learning portion 62 is explained along the flowchart of FIG. 8. This process starts in response to the input of the initialization instruction.

A three dimensional coordinate $s^{(n)}$ of the n-th feature point, a shape matrix S showing a three dimensional shape to be obtained, and a homogeneous shape matrix ~S where a row vector whose elements are all one is added to the shape matrix S, are shown by equations (36) to (38). The average face model $S_A$ and individual face model $S_P$ are shown in the form of the homogeneous shape matrix ~S.

(Expression 14)    (36)
$$s^{(n)} = (X^{(n)} \quad Y^{(n)} \quad Z^{(n)})^T \in R^3$$

$$S \equiv (s^{(1)} \ldots s^{(N_f)}) \in R^{3 \times N_f} \quad (37)$$

$$\tilde{S} \equiv \begin{pmatrix} s^{(1)} & \ldots & s^{(N_f)} \\ 1 & \ldots & 1 \end{pmatrix} \quad (38)$$

A motion matrix M, a homogeneous motion matrix ~M, Θ, and a row vector $\theta_d$ of the d-th motion matrix are shown by equations (39) to (42) wherein $m_i$ is the i-th basis vector of the motion.

(Expression 15)

$$M = (m_1 \ldots m_3) \in R^{D \times 3} \quad (39)$$

$$\tilde{M} = (m_1 \ldots m_4) \in R^{D \times 4} \quad (40)$$

$$\Theta = \tilde{M} = (m_1 \ldots m_4) \in R^{D \times 4} \quad (41)$$

$$\theta_d = (m_{1d} \ldots m_{4d}) \in R^4 \quad (42)$$

When this process starts, the face model switching portion 63 outputs a switching signal to select the average face model $S_A$ as the face model $C_a$ provided to the estimation portion 8 at Step S110, and the flow goes to Step S120.

Accordingly, in the estimation portion 8, at each time t at which a video is inputted, the affine parameter $A_t$ and the feature point estimation distribution parameters $x_t$, $V_t$ are calculated using the average face model $S_A$. In the head pose calculation portion 9, a head pose θx, θy, and θz is calculated in accordance with the affine parameter $A_t$ obtained in the estimation portion 8.

At Step S120, the test distribution q(M) of the motion matrix is initialized, and then the flow goes to Step S130.

The test distribution q(S) of the shape matrix is defined by the shape matrix S and $\Sigma_s$ showing a variance of the shape matrix S (hereinafter called distribution parameters of the shape matrix). The test distribution q(M) of the motion matrix is defined by the motion matrix Θ and VΘ showing a variance of the motion matrix Θ (hereinafter called distribution parameters of the motion matrix). All the elements of the distribution parameters Θ and VΘ of the motion matrix are set to the same predetermined value (for example, 0, 1, or 0.5) by this initialization.

At Step S130, it is determined whether a preset specific number T feature point estimation distribution parameters $x_t$, $V_t$ have been obtained. When the feature point estimation distribution parameters $x_t$, $V_t$ have not been obtained, the flow waits until the feature point estimation distribution parameters $x_t$, $V_t$ have been obtained.

When the specific number T feature point estimation distribution parameters $x_t$, $V_t$ have been obtained, the flow goes to Step S140. In accordance with the obtained feature point estimation distribution parameters $x_t$, $V_t$, the observation matrix W and the reliability matrix Q are generated. Thus, Step S140 may function as an observation matrix generating means or unit and a reliability evaluating means or unit. Then the flow goes to Step S150.

A feature point vector $x_{1:T}^{(n)}$ produced in accordance with the obtained feature point parameters $x_t$ and including time-sequential arrangement (t=1–T) of the positions of the n-th (n=1, 2, . . . , $N_f$) feature points is shown by equation (43). The observation matrix W is shown by equation (44). In other words, the observation matrix W includes arrangement of all the feature points by vectoring the feature point vector $x_{1:T}^{(n)}$ to a column vector.

(Expression 16)    (45)

$$Q \equiv \begin{pmatrix} \sigma_{x,1}^{(1)} & & \sigma_{x,1}^{(N_f)} \\ & \ddots & \\ \sigma_{x,D}^{(1)} & & \sigma_{x,D}^{(N_f)} \end{pmatrix} \in R^{D \times N_f}, D = 2T$$

A reliability matrix Q is produced in accordance with the feature point estimation distribution parameter $V_t$, and shown by equation (45) wherein d=2t−1 is an x component at the time t, and d=2t is a y component at the time t, and $\sigma_{x,d}^{(n)}$ is a d-th (d=1, 2, ..., 2T) observation reliability of a n-th feature point. In other words, the reliability matrix Q has the same degree as the observation matrix W.

(Expression 17) (45)

$$Q \equiv \begin{pmatrix} \sigma_{x,1}^{(1)} & & \sigma_{x,1}^{(N_f)} \\ & \ddots & \\ \sigma_{x,D}^{(1)} & & \sigma_{x,D}^{(N_f)} \end{pmatrix} \in R^{D \times N_f}, D = 2T$$

At Step S150, the process for calculating the test distribution q(S) of the shape matrix is executed as the variational Bayes E step, and then the flow goes to Step S160.

At Step S150, specifically, in accordance with W, Q obtained at Step S140 and the latest distribution parameters Θ, VΘ of the motion matrix, which are initially set at Step S120, or updated at after-mentioned Step S160, $s^{(n)}, \Sigma_s^{(n)}$ are obtained at each feature point (n=1-$N_f$) by use of the following equation (46), (47) to update the parameters S, $\Sigma_s$ of the shape matrix. The $I_k$ is a unit matrix of k-th order.

(Expression 18) (46)

$$\hat{s}^{(n)} = \bar{s}^{(n)} + K^{(n)}(x_{1:T}^{(n)} - \hat{x}^{(n)})$$

$$\hat{\Sigma}_s^{(n)} = (I_3 - K^{(n)} \hat{M}) \Sigma_s^{(n)}$$ (47)

Equations (46), (47) are obtained by solving equation (48) to which equation (32) is rewritten using the three dimensional coordinate $s^{(n)}$ and variance $\Sigma_s^{(n)}$ of the feature points. Specifically, the calculation is executed using equations (49) to (56).

(Expression 19) (48)

$$q(S) = \prod_{n=1}^{N_f} q(s^{(n)}) = \prod_{n=1}^{N_f} N(s^{(n)} | \hat{s}^{(n)}, \hat{\Sigma}_s^{(n)})$$

$$\hat{V}^{(n)-1} = \sum_{d=1}^{D} \sigma_{x,d}^{(n)-2} \hat{V}_d^{-1}$$ (49)

$$\Xi^{(n)} = I_4 + \hat{V}^{(n)-1}$$ (50)

$$\Xi^{(n)} = \begin{pmatrix} \Xi_{1,1}^{(n)} & & \Xi_{1,3}^{(n)} & \Xi_{1,4}^{(n)} \\ & \ddots & & \vdots \\ \Xi_{3,1}^{(n)} & & \Xi_{3,3}^{(n)} & \Xi_{3,4}^{(n)} \\ \Xi_{4,1}^{(n)} & \cdots & \Xi_{4,3}^{(n)} & \Xi_{4,4}^{(n)} \end{pmatrix} = \begin{pmatrix} \Xi_{ss}^{(n)} & \Xi_{s1}^{(n)} \\ \Xi_{1s}^{(n)} & \Xi_{11}^{(n)} \end{pmatrix}$$ (51)

$$\bar{s}^{(n)} = -\Xi_{ss}^{(n)-1} \Xi_{s1}^{(n)}$$ (52)

$$\Sigma_s^{(n)} = \Xi_{ss}^{(n)-1}$$ (53)

$$\hat{x}^{(n)} = \hat{\Theta} \begin{pmatrix} \bar{s} \\ 1 \end{pmatrix}$$ (54)

$$\hat{\Sigma}_x^{(n)} = \Sigma_x^{(n)} + \hat{M} \Sigma_s^{(n)} \hat{M}^T$$ (55)

$$K^{(n)} = \Sigma_s^{(n)} \hat{M} \hat{\Sigma}_x^{(n)-1}$$ (56)

At Step S160, the process for calculating the test distribution q(M) of the motion matrix is executed as the variational Bayes M step, and then the flow goes to Step S170.

At Step S160, specifically, in accordance with W, Q obtained at Step S140 and the latest parameters S, $\Sigma_s$ of the shape matrix, which are set at Step S150, $\theta_d, V_d$ are obtained at each row vector $\theta_d$ of the motion matrix by use of the following equations (57), (58) to update the distribution parameters Θ, VΘ of the motion matrix. An expected value calculation is described using the description rule shown by equation (59).

(Expression 20) (57)

$$\hat{\theta}_d = \left( \left( e_d^T \Sigma_\theta^{-1} + \sum_{n=1}^{N_f} \sigma_{x,d}^{(n)-2} \langle x_d^{(n)} \tilde{s}^{(n)T} \rangle_{q(s^{(n)})} \right) \hat{V}_d^{-1} \right)^T$$

$$\hat{V}_d^{-1} = \left( \Sigma_\theta^{-1} + \sum_{n=1}^{N_f} \sigma_{x,d}^{(n)-2} \langle \tilde{s}^{(n)} \tilde{s}^{(n)T} \rangle_{q(s^{(n)})} \right)^{-1}$$ (58)

$$\langle f(x) \rangle_{q(x)} = \int q(x) f(x) dx$$ (59)

Equations (57), (58) are obtained by solving equation (60) to which equation (35) is rewritten using the three dimensional coordinate $s^{(n)}$ and variance $\Sigma_s^{(n)}$ of the feature points. Specifically, the above calculation is executed using equations (61), (62).

(Expression 21) (60)

$$q(\tilde{M}) = q(\Theta) = \prod_{d=1}^{D} q(\theta_d) = \prod_{d=1}^{D} N(\theta_d | \hat{\theta}_d, \hat{V}_d^{-1})$$

$$\langle x_d^{(n)} \tilde{s}^{(n)T} \rangle_{q(s^{(n)})} = x_d^{(n)} \hat{\tilde{s}}^{(n)T}$$ (61)

$$\langle \tilde{s}^{(n)} \tilde{s}^{(n)T} \rangle_{q(s^{(n)})} = \begin{pmatrix} \hat{s}^{(n)} \hat{s}^{(n)T} + \hat{\Sigma}_s^{(n)} & \hat{s}^{(n)} \\ \hat{s}^{(n)T} & 1 \end{pmatrix}$$ (62)

At Step S170, in accordance with the distribution parameters S, $\Sigma_s$ (the test distribution q(S)) of the shape matrix and distribution parameters Θ, VΘ (test distribution q(M)) of the motion matrix calculated at Steps S150, S160, the free energy F(q(M, S)) is calculated using equation (26), and then the flow goes to Step S180.

A value of the free energy becomes greater as the positions estimated in accordance with the motion matrix M and shape matrix S obtained by the above processes become nearer to the positions (observation W) obtained by the observation.

At Step S180, it is determined whether to satisfy a termination condition that the free energy calculated at Step S170 is greater than a preset energy threshold. When the condition is not satisfied, the flow returns to Step S150, and repeats Steps S150 to S170. When the condition is satisfied, the flow goes to Step S190. Thus, Steps S150 to S170 may function as a factorizing means or unit for factorizing the observation matrix to thereby generate the shape matrix and the motion matrix; further, Steps S150 to S170 may function as an estimating means or unit by being alternately repeated. Moreover, Step S180 may function as a terminating means or unit for terminating the above estimating means when a preset termination condition is satisfied.

As the energy threshold, for example, the free energy calculated using the shape matrix showing the average face model $S_A$ and the motion matrix M obtained by the above processes, is used. The energy threshold is not limited to this free energy. The energy threshold may be a fixed value.

At Step S190, the shape matrix S obtained by the above processes is outputted as the individual face model $S_p$, the switching signal is outputted to select the individual face model $S_p$ as the face model $C_a$ provided to the estimation portion 8 by the face model switching portion 63, and then this flow terminates.

Accordingly, after that, in the estimation portion 8, at each time t at which a video is inputted, the affine parameter $A_t$ using the individual face model $S_p$ is calculated, and the head pose θx, θy, and θz is calculated in the head pose calculation portion 9 in accordance with the affine parameter $A_t$.

Advantage

As described above, in the image processing device 1, just after starting the estimation of the head pose θx, θy, and θz, the affine parameter $A_t$ is calculated (a direction of the face is estimated) using the average face model $S_A$, and simultaneously, the individual face model $S_p$ is learned, and the average model $S_A$ is switched to the individual face model $S_p$ when an accuracy of the individual face model $S_p$ is improved sufficiently.

Accordingly, in the image processing device 1, whoever the driver is, the head pose θx, θy, and θz can be estimated stably and accurately from the initial stage of the estimation, and the estimation result with high accuracy can be obtained after the average face model $S_A$ is switched to the individual face model $S_p$.

In other words, the estimation accuracy is more likely to be improved when the individual face model $S_p$ is used in comparison to when the average face model $S_A$ is used. However, when the individual face model $S_p$ is used, the learning takes long time, and an error may become greater in case of failure of the calculation in comparison to when the average face model $S_A$ is used, but in the image processing device 1, these problems can be solved.

In the image processing device 1, since the switch from the average face model $S_A$ to the individual face model $S_p$ is determined using the free energy, the estimation accuracy can be improved certainly after the switch.

The accuracy of the individual face model $S_p$ cannot be evaluated quantitatively because there is no standard data for the individual face model. The observation matrix W is factorized to the motion matrix M and shape matrix S to maximize the free energy. The free energy can be considered to quantitatively show a degree to which the prediction value calculated from the motion matrix M and shape matrix S fits the observation value (observation matrix W). Accordingly, the free energy can be used as a standard for evaluating the accuracy of the face model.

In the image processing device 1, the observation matrix W is factorized using the reliability matrix Q showing reliability (variance of the probability distribution (normal distribution)) showing positions of the feature points) of each observation value $x_t$ forming the observation matrix W. The reliability matrix Q is reflected by the variance $\Sigma_s$ of the test distribution q(S) (see equations (43) to (53)), so that the factorization is executed with emphasis on the feature point having higher reliability.

Accordingly, in the image processing device 1, without removing the observation value $x_t$ having low reliability due to hiding of feature points, wrong tracking, and flame-out from the observation matrix W, the factorization can be executed certainly. Since the data having higher reliability is more emphasized, the accuracy of the generated shape matrix and motion matrix can be improved.

In the image processing device 1, since the observation matrix W is stochastically factorized using the variational Bayesian method to obtain the test distribution q(M) of the motion matrix M and the test distribution q(S) of the shape matrix S, the influence of the noise superimposed on the observation value $x_t$ can be reduced remarkably.

Second Embodiment

Next, a second embodiment is explained. In this embodiment, since only part of the processes in the individual face model learning portion 62 is different from those in the first embodiment, the different part is mainly explained.

Process in the Individual Face Model Learning Portion

FIG. 8 is a flowchart showing the process executed by the individual face model learning portion 62. As well as in the first embodiment, this process is started by the initialization instruction. Since Steps S210 to S250 are the same as Steps S110 to S150 in the first embodiment, their explanation is omitted.

The specific number used in Step S230 may be smaller (for example, from a few tenths to a few hundredths of the specific number) than that in the first embodiment. In Step S260, the process for calculating the test distribution q(M) of the motion matrix is executed as the variational Bayes M step, and then the flow goes to Step S270.

In Step S260, specifically, in accordance with W, Q obtained in Step S240, the latest distribution parameters S, $\Sigma_s$ of the shape matrix, which are set at Step S250, and the statistics calculated in the former cycle (see equations (66), (67)), $\theta_d$, $V_d$ are obtained at each vector $\theta_d$ of the motion matrix by use of equations (63) to (67) to update the distribution parameters Θ, VΘ of the motion matrix.

(Expression 22) (63)

$$\hat{\theta}_d = \left(\left(e_d^T \Sigma_\theta^{-1} + \sum_{n=1}^{N_f} \sigma_{x,d,t}^{(n)-2} \langle\langle x_{d,\tau}^{(n)} \tilde{s}_\tau^{(n)T}\rangle\rangle_t\right) \hat{V}_d^{-1}\right)^T$$

$$\hat{V}_d^{-1} = \left(\Sigma_\theta^{-1} + \sum_{n=1}^{N_f} \sigma_{x,d,t}^{(n)-2} \langle\langle \tilde{s}_\tau^{(n)} \tilde{s}_\tau^{(n)T}\rangle\rangle_t\right)^{-1}$$ (64)

Wherein $$\eta_t = \left(\sum_{\tau=1}^{t} \Lambda(\tau, t)\right) - 1$$ (65)

$$\langle\langle x_{d,\tau}^{(n)} \tilde{s}_\tau^{(n)T}\rangle\rangle_t = (1 - \eta_t)\langle\langle x_{d,\tau}^{(n)} \tilde{s}_\tau^{(n)T}\rangle\rangle_{t-1} + \eta_t x_{d,t}^{(n)} \hat{s}_t^{(n)T}$$ (66)

$$\langle\langle \tilde{s}_\tau^{(n)} \tilde{s}_\tau^{(n)T}\rangle\rangle_t = (1 - \eta_t)\langle\langle \tilde{s}_\tau^{(n)} \tilde{s}_\tau^{(n)T}\rangle\rangle_{t-1} + \eta_t \begin{pmatrix} \hat{s}_t^{(n)} \hat{s}_t^{(n)T} + \hat{\Sigma}_{s,t}^{(n)} & \hat{s}_t^{(n)} \\ \hat{s}_t^{(n)T} & 1 \end{pmatrix}$$ (67)

In Step S270, in accordance with the statistics calculated in the former cycle (see equation (70)), the shape matrix S is updated using equations (68) to (70). Thus, Step S270 may function as an updating means or unit.

(Expression 23) (68)

$$\langle \tilde{s}_\tau \rangle_t = \left(\langle\langle \tilde{s}_\tau^{(1)}\rangle\rangle_t \quad \ldots \quad \langle \tilde{s}_\tau^{(N_f)}\rangle_t\right)$$

Wherein $$\eta_t = \left(\sum_{\tau=1}^{t} \Lambda(\tau, t)\right)^{-1}$$ (69)

$$\langle\langle \tilde{s}_\tau^{(n)}\rangle\rangle_t = (1 - \eta_t)\langle\langle \tilde{s}_\tau^{(n)}\rangle\rangle_{t-1} + \eta_t \hat{s}_t^{(n)T}$$ (70)

Steps S280 to S300 are the same as Steps S170 to S190 in the first embodiment, and thus are not explained. At Step S290, when the termination condition is not satisfied, the flow goes to Step S230.

Advantage

As described above, in this embodiment, the order of the observation W (specific number T) is limited to a small number, and E step and M step are executed once alternately to obtain the test distribution p(M) of the motion matrix and the test distribution p(S) of the shape matrix repeatedly. By use of the online variational Bayesian estimation, in which their results are multiplied by a factor such that a ratio of older data is more decreased, and then are added to each other, the factorization is executed.

Accordingly, in this embodiment, even when the number of the used image sequences is increased, an amount of the processes only increases additively by a unit of an amount of the processes of executing E step and M step once alternately, but does not increase exponentially. The processing load required for the factorization (and time required for the process) can be reduced remarkably.

As a result, the computing unit mounted to a vehicle has usually low calculation ability, but even in such a case, this embodiment is applicable.

Another Embodiment

The embodiments of the present invention have been explained. The present invention is not limited to the above embodiments. Various modifications are possible without departing from the scope of the invention.

In the above embodiment, the affine parameter is used to estimate the head pose. If possible, for example, the head pose may be estimated directly using the extended Kalman filter, for example without using the affine parameter.

The termination condition for terminating the factorization is satisfied when the free energy obtained from the individual face model $S_p$ which is being learned is greater than an energy threshold, which is the free energy obtained from the average face model $S_A$. The energy threshold may be a preset fixed value.

The termination condition may be satisfied when the frequency of the repeated processes is greater than a preset frequency threshold, instead of the free energy. In this case, since the free energy does not need to be calculated to determine whether to terminate the process, the processing load in the device can be reduced further, and the process can be terminated within a predetermined time.

In the above embodiment, by use of the Bayesian estimation method and variational Bayesian estimation method, the factorization is executed. As long as a degree of reliability can be reflected by each element of the observation matrix W in the factorization, any method can be used. For example, the factorization may be executed by the singular value decomposition.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

Aspects of the subject matter described herein are set out in the following clauses.

As a first aspect, in a three dimensional shape reconstitution device, an observation matrix generating unit inputs an image sequence of a captured target object, tracks multiple preset feature points on an image plane of the target object, and generates an observation matrix of time-sequential arrangement of positions of the feature points, and a reliability evaluating unit generates a position reliability evaluation value showing reliability of a position of each feature point. A factorizing unit factorizes an observation matrix generated in the observation matrix generating unit to generate a shape matrix showing a three dimensional shape of a target object and a motion matrix showing a motion of the target object. At this time, the factorizing unit executes factorization in favor of a feature point having a higher position reliability evaluation value.

In other words, in the three dimensional shape reconstitution device, without removing the feature points having less reliability due to superposition of noise, factorization is executed to achieve good fitting at the feature points having high reliability (position reliability evaluation value).

Accordingly, in the three dimensional shape reconstitution device, even when unreliable data exists in the observation matrix due to hiding of feature points, wrong tracking, and flame-out, the factorization can be executed certainly without removing the unreliable data. Additionally, the accuracy of generated shape matrix and motion matrix can be improved because data having higher reliability is emphasized.

As a second aspect, in the three dimensional shape reconstitution device according to the first aspect, the factorizing unit may execute factorization to obtain a test distribution q(M) of a motion matrix M and a test distribution q(S) of a shape matrix S such that a likelihood P(W|M, S) is maximized after reflecting the reliability evaluation value in a variance of the test distribution q(S) of the shape matrix in accordance with the Bayes estimation equation defining a relationship between a posterior probability P(M, S|W) and the likelihood P(W|M, S), wherein W is the observation matrix, M is the motion matrix, S is the shape matrix, and q(X) is a distribution stochastically showing a value of each element of a matrix X.

In such a three dimensional shape reconstitution device, the motion matrix M and shape matrix S can be obtained stochastically by Bayes estimation. Accordingly, the influence of noise superimposed on positions of feature points tracked on an image plane can be reduced remarkably, and the variance of the test distribution q(S) of the shape matrix reflects the reliability evaluation value. As a result, the factorization can be achieved with an emphasis on the feature points having higher reliability evaluation values.

As a third aspect, in the three dimensional shape reconstitution device according to the second aspect, to execute factorization by using Bayes estimation, the factorizing unit according to the second aspect may be provided as follows. The estimating unit alternately executes a first step of estimating the test distribution q(S) of the shape matrix with fixing the test distribution q(M) of the motion matrix and a second step of estimating the test distribution q(M) of the motion matrix with fixing the test distribution q(S) of the shape matrix, the first step being executed using an estimation result of the second step, and the second step being executed using an estimation result of the first step. A terminating unit terminates the estimating unit when a preset termination condition is satisfied. A shape matrix is obtained from the finally obtained test distribution q(S) of the shape matrix because the finally obtained test distribution q(S) is a distribution of the shape matrix.

In this case, the factorizing unit achieves the variational Bayesian estimation method, in which the first step corresponds to E step, and the second step corresponds to M step.

Even by using the variational Bayesian estimation method, in response to the increase of the image sequence used for calculation (namely, the increase of the number of dimensions of the observation matrix), the calculation amount (calculation time) fatally increases exponentially.

As a fourth aspect, in the three dimensional shape reconstitution device according to the third aspect, when the factorizing unit executes factorization by the variational Bayes estimation method, an energy calculating unit may calculate a free energy relating to a test posterior distribution q(S, M)=q(S) q(M) each time an estimation result of the test distributions q(S), q(M) obtained in the estimating unit. Then, the terminating unit may use a termination condition which is satisfied when a calculation result in the energy calculation unit is greater than a preset energy threshold.

Since, fundamentally, the motion matrix and shape matrix are estimated to maximize the free energy in the variational Bayes estimation method, the shape matrix having a required accuracy can be obtained certainly by using the free energy as the termination condition.

As a fifth aspect, in the terminating unit of the three dimensional shape reconstitution device according to the third aspect, when the frequency of calculations of the test distribution q(S) of the shape matrix in the estimating unit is greater than a preset frequency threshold, the termination condition may be satisfied. In this case, since the free energy does not need to be calculated, the processing load in the device can be reduced further, and the processing can be always terminated within a predetermined time.

As a sixth aspect, in the three dimensional shape reconstitution device according to the second aspect, the factorizing unit may be provided as follows. At each generation of the observation matrix in the observation matrix generating unit, the estimating unit executes the first step of estimating the test distribution q(S) of the shape matrix with fixing the test distribution q(M) of the motion sequence and the second step of estimating the test distribution q(M) of the motion matrix with fixing the test distribution q(S) of the shape matrix alternately, the first step being executed using an estimation result of the second step, and the second step being executed using an estimation result of the first step. In accordance with the test distribution q(S) of the shape matrix estimated in the estimating unit, an updating unit updates a distribution of a shape matrix as an output. When a preset termination condition is satisfied, the terminating unit terminates the estimating unit and the updating unit. Then, the factorizing unit obtains a shape matrix from the distribution of the shape matrix finally obtained by the updating unit.

In other words, the estimating unit executes the first step (E step) and the second step (M step) once respectively with limiting the image sequence used for calculation, and executes this process repeatedly. Each time a calculation result is obtained from the estimating unit, a distribution of the shape matrix is updated in accordance with the calculation result. This achieves the variational Bayesian estimation method by sequential calculation (so-called online).

In the three dimensional shape reconstitution device, the image sequence used is divided into multiple sequences. Since each divided image sequence is factorized, the processing amount only increases additively by a unit of one process in the estimating unit, and the processing amount does not increase exponentially, although the image sequences increase. Accordingly, the processing load required for the factorization (and time required for the processing) can be reduced remarkably.

As a seventh aspect, in the three dimensional shape reconstitution device according to the sixth aspect, the factorizing unit may be provided similarly with that in the fourth aspect. Further, as an eighth aspect, in the three dimensional shape reconstitution device according to the sixth aspect, the terminating unit may be provided similarly with that of the fifth aspect.

As a ninth aspect, in the three dimensional shape reconstitution device according to the second aspect, the reliability evaluating unit may use a variance value of the distribution of the observation matrix as the position reliability evaluation value. Particularly, when feature points are tracked by the Bayes estimation, the variance value of the distribution of the positions of the feature points (elements of the observation matrix) is always calculated. Accordingly, the processing load can be reduced.

As a tenth aspect, the three dimensional shape reconstitution device according to the first aspect may be mounted to a vehicle. A computing unit mounted to the vehicle has usually a low calculation ability, but even in such a case, the three dimensional shape reconstitution device is applicable.

As an eleventh aspect, in an estimation device, a shape model setting unit sets shape models showing three dimensional shapes of target objects having individual differences. A feature point extracting unit inputs an image sequence of a captured specific target object, the specific target object being one of the target objects, and extracts multiple feature points on the specific target object. In other words, when shapes of the target objects have different individual differences, a positional relationship among the multiple feature points differs in each target object. An object direction estimating unit estimates a direction of the specific target object in accordance with the shape models set in the shape model setting unit and with the feature points extracted in the feature point extracting unit. A model generating unit stores an average model showing an average shape of a target object in a storing unit. A learning unit learns an individual model showing a shape of a specific target model in accordance with an extraction result in the feature point extracting unit. A model switching unit sets the average model stored in the storing unit at a start of the device, and sets the individual model as a shape model instead of the average model when a switching condition that the individual model learned in the learning unit has a higher reliability than the average model is satisfied.

In other words, in the estimation device, the average model is set as the shape model at a start of the device, and the estimation of a direction of the target object is executed with a stable accuracy just after the start. At the same time, the learning unit learns individual models. After the individual model learned in the learning unit has a higher reliability than the average model (the switching condition is satisfied), the individual model is set as the shape model. A direction of the target object is estimated at a higher accuracy than that in case of using the average model.

Accordingly, in the estimation device, stable estimation results can be obtained using the average model just after the start of the processing, and high estimation results can be obtained after the average model is switched to the individual model.

As a twelfth aspect, in the estimation device according to the eleventh aspect, the learning unit may be provided as follows. The observation matrix generating unit generates an observation matrix in which positions of feature points extracted in the feature point extracting unit are arranged time-sequentially. The factorizing unit factorizes the observation matrix generated in the observation matrix generating unit, generates a shape matrix showing a three dimensional shape of a specific target object and a motion matrix showing a motion of the specific target object, and sets the generated shape matrix as an individual model.

As a thirteenth aspect, in the estimation device according to the twelfth aspect, W is the observation matrix, M is the motion matrix, S is the shape matrix, and q(X) is the distribution stochastically showing the value of each element of the matrix X. The factorizing unit may preferably execute factorization calculations stochastically by obtaining the test distribution q(M) of the motion matrix and the test distribution q(S) of the shape matrix such that the likelihood P(W|M, S) is maximized in accordance with the Bayes estimation equation defining a relationship between the posterior probability P(M, S|W) and likelihood P(W|M, S).

In the estimation device, the motion matrix M and the shape matrix S are obtained stochastically by the Bayes estimation, so that the influence of noise superimposed on the positions of the feature points tracked on the image plane can be reduced remarkably.

As a fourteenth aspect, in the estimation device according to the thirteenth aspect, when the factorization is executed using the Bayes estimation, the factorizing unit may be provided as follows. The estimating unit alternately executes the first step of estimating the test distribution q(S) of the shape matrix with fixing the test distribution q(M) of the motion matrix and the second step of estimating the test distribution q(M) of the motion matrix with fixing the test distribution q(S) of the shape matrix, the first step being executed using an estimation result of the second step, and the second step being executed using an estimation result of the first step. The terminating unit terminates the estimating unit when a preset termination condition is satisfied. A shape matrix is obtained from the finally obtained test distribution q(S) of the shape matrix because the finally obtained test distribution q(S) is a distribution of the shape matrix. In this case, the model switching unit may use the terminating condition in the terminating unit as a switching condition.

The factorizing unit achieves the variational Bayes estimation method, in which the first step corresponds to E step, and the second step corresponds to M step.

As a fifteenth aspect, in the estimation device according to the fourteenth aspect, when the factorizing unit executes factorization by the variational Bayes estimation method, the energy calculating unit may calculate a free energy relating to a test posterior distribution q(S, M)=q(S) q(M) each time an estimation result of the test distributions q(S), q(M) obtained in the estimating unit. Additionally, the terminating unit may use a termination condition satisfied when a calculation result in the energy calculation unit is greater than a preset energy threshold.

Since the motion matrix and shape matrix are estimated to maximize the free energy in the variational Bayes estimation method, the shape matrix having a required accuracy can be obtained certainly using the free energy as the termination condition.

As a sixteenth aspect, in the terminating unit of the estimation device according to the fourteenth aspect, when the frequency of calculations of the test distribution q(S) of the shape matrix in the estimating unit is greater than a preset number threshold, the termination condition may be satisfied.

In this case, since the free energy does not need to be calculated, the processing load in the device can be reduced further, and the processing can be always terminated within a predetermined time.

As a seventeenth aspect, in the estimation device according to the thirteenth aspect, to execute factorization using Bayes estimation, the factorizing unit may be provided as follows. At each generation of the observation matrix in the observation matrix generating unit, the estimating unit executes the first step of estimating the test distribution q(S) of the shape matrix with fixing the test distribution q(M) of the motion matrix and the second step of estimating the test distribution q(M) of the motion matrix with fixing the test distribution q(S) of the shape matrix, the first step being executed using an estimation result of the second step, and the second step being executed using an estimation result of the first step. In accordance with the test distribution q(S) of the shape matrix estimated in the estimating unit, the updating unit updates a distribution of the shape matrix as an output. When a preset termination condition is satisfied, the terminating unit terminates the estimating unit and the updating unit. Then, the factorizing unit obtains a shape matrix from the distribution of the shape matrix finally obtained by the updating unit. In this case, the model switching unit may use the terminating condition in the terminating unit as a switching condition.

In other words, the estimating unit executes the first step (E step) and the second step (M step) once respectively with limiting the image sequence used for calculation, and executes this process repeatedly. Each time a calculation result is obtained from the estimating unit, a distribution of the shape matrix is updated in accordance with the calculation result. This achieves the variational Bayesian estimation method by sequential calculation (so-called online).

In the estimation device, the image sequence used for learning the shape matrix is divided into multiple image sequences. The factorization is executed for each divided image sequence. The processing amount only increases additively by a unit of one process in the estimating unit, and the processing amount does not increase exponentially although the image sequences increase. Accordingly, the processing load required for the factorization (and time required for the processing) can be reduced remarkably.

As an eighteenth aspect, in the estimation device according to the seventeenth aspect, the energy calculating unit and the terminating unit may be provided similarly with those of the fifteenth aspect. Further, as a nineteenth aspect, in the estimation device according to the seventeenth aspect, the terminating unit may be provided similarly with that of the sixteenth aspect.

As a twentieth aspect, as the target object, for example, a human head can be considered. Particularly when the person is a driver of a vehicle, an estimation result in the estimation device can be preferably used for assisting the driving of the vehicle, and for improving the safety traveling of the vehicle.

It will be obvious to those skilled in the art that various changes may be made in the above-described embodiments of the present invention. However, the scope of the present invention should be determined by the following claims.

What is claimed is:

1. An estimation device comprising:
a camera;
a shape model setting unit configured for setting shape models showing three dimensional shapes of target objects whose shapes have individual differences;
a feature point extracting unit configured for inputting an image sequence of a captured specific target object, the specific target object being one of the target objects, and extracting a plurality of feature points existing on the specific target object; and
an object direction estimating unit configured for estimating a direction of the specific target object in accordance with the shape models which are set in the shape model setting unit and the feature points extracted in the feature point extracting unit, the shape model setting unit including:
a storing unit configured for storing an average model showing an average shape of the target objects;
a learning unit configured for learning an individual model showing a shape of the specific target object in accordance with a result of extracting in the feature point extracting unit; and
a model switching unit configured for setting the average model stored in the storing unit as the shape model at a start of the device, and for setting the individual model as the shape model instead of the average model when a switching condition showing that the individual model learned in the learning unit becomes more reliable than the average model is satisfied.

2. The estimation device of claim 1, wherein the specific target object is a human head.

3. The estimation device of claim 2,
wherein the learning unit includes:
an observation matrix generating unit configured for generating an observation matrix including time-sequence arrangement of the feature points extracted in the feature point extracting unit; and
a factorizing unit configured for factorizing the observation matrix generated in the observation matrix generating unit to generate a shape matrix showing a three dimensional shape of the specific target object and a motion matrix showing a motion of the specific target object, wherein the shape matrix is the individual model.

4. The estimation device of claim 3, wherein
in accordance with equations of Bayes estimation defining a relationship between posterior probability $P(M, S|W)$ and likelihood $P(W|M, S)$, the factorizing unit stochastically executes factorization by obtaining a test distribution $q(M)$ of the motion matrix and the test distribution $q(S)$ of the shape matrix such that the likelihood $P(W|M, S)$ is maximized, wherein W is the observation matrix, M is the motion matrix, S is the shape matrix, $q(X)$ is a distribution stochastically showing values of elements of a matrix X.

5. The estimation device of claim 4,
wherein the factorizing unit includes:
an estimating unit configured for alternately repeating a first step of estimating the test distribution $q(S)$ of the shape matrix with fixing the test distribution $q(M)$ of the motion matrix, and a second step of estimating the test distribution $q(M)$ of the motion matrix with fixing the test distribution $q(S)$ of the shape matrix, the first step being executed using an estimation result of the second step, and the second step being executed using an estimation result of the first step; and
a terminating unit configured for terminating the estimating unit when a preset termination condition is satisfied, wherein the finally obtained test distribution $q(S)$ of the shape matrix is regarded as a distribution of the shape matrix, and the shape matrix S is obtained from the distribution of the shape matrix, and the switching unit uses the termination condition as the switching condition.

6. The estimation device of claim 5, comprising:
an energy calculating unit configured for calculating a free energy relating to a test posterior distribution $q(S, M)=q(S)q(M)$ each time an estimation result of the test distributions $q(S), q(M)$ is obtained in the estimating unit,
wherein the terminating unit uses, as the termination condition, a condition that a calculation result in the energy calculating unit is greater than a preset energy threshold.

7. The estimation device of claim 5, wherein
the terminating unit uses, as the termination condition, a condition that a frequency of calculations of the test distribution $q(S)$ of the shape matrix in the estimating unit is greater than a preset frequency threshold.

8. The estimation device of claim 4,
wherein the factorizing unit includes:
an estimating unit for, each time the observation matrix is generated in the observation matrix generating unit, executing a first step of estimating the test distribution $q(S)$ of the shape matrix with fixing the test distribution $q(M)$ of the motion matrix, and a second step of estimating the test distribution $q(M)$ of the motion matrix with fixing the test distribution $q(S)$ of the shape matrix, the first step being executed using an estimation result of the second step, and the second step being executed using an estimation result of the first step;
an updating unit configured for updating a distribution of the shape matrix, the distribution being to be outputted, in accordance with a sequence of the test distribution $q(S)$ of the shape matrix, the test distribution being estimated in the estimating unit; and
a terminating unit configured for terminating the estimating unit and the updating unit when a preset termination condition is satisfied,
wherein the shape matrix S is obtained from a distribution of the shape matrix, the distribution being finally obtained in the updating unit, and
the model switching unit uses the termination condition as the switching condition.

9. The estimation device of claim 8, comprising:
an energy calculating unit configured for calculating a free energy relating to a test posterior distribution $q(S, M)=q(S)q(M)$ each time an estimation result of the test distributions $q(S), q(M)$ is obtained in the estimating unit,
wherein the terminating unit uses, as the termination condition, a condition that a calculation result in the energy calculating unit is greater than a preset energy threshold.

10. The estimation device of claim 8, wherein
the terminating unit uses, as the termination condition, a condition that a frequency of calculations of the test distribution $q(S)$ of the shape matrix in the estimating unit is greater than a preset frequency threshold.

11. A method for estimating a direction of a target object, the method comprising:
inputting an image sequence of a captured specific target object, the specific target object being one of target objects;
extracting a plurality of feature points existing on the specific target object;
storing an average model showing an average three dimensional shape of the target objects whose shapes have individual differences;
learning an individual model showing a three dimensional shape of the specific target object in accordance with a result of the extracting;
setting the average model as the shape model initially, and setting the individual model as the shape model instead of the average model when a switching condition showing that the learned individual model becomes more reliable than the average model is satisfied; and
estimating a direction of the specific target object in accordance with the set shape model and the extracted feature points.

12. The method of claim 11, wherein the specific target object is a human head.

13. An estimation device comprising:
means for capturing an image of a specific target object;
means for inputting the image sequence of the captured specific target object, the specific target object being one of target objects;
means for extracting a plurality of feature points existing on the specific target object;
means for storing an average model showing an average three dimensional shape of the target objects whose shapes have individual differences;
means for learning an individual model showing a three dimensional shape of the specific target object in accordance with a result of the extracting;
means for setting the average model as the shape model initially, and setting the individual model as the shape model instead of the average model when a switching condition showing that the learned individual model becomes more reliable than the average model is satisfied; and
means for estimating a direction of the specific target object in accordance with the set shape model and the extracted feature points.

14. The estimation device of claim 13, wherein the specific target object is a human head.

* * * * *